C. T. CARLETON.
YOKE FOR CATTLE.
APPLICATION FILED APR. 16, 1910.
977,928.
Patented Dec. 6, 1910.
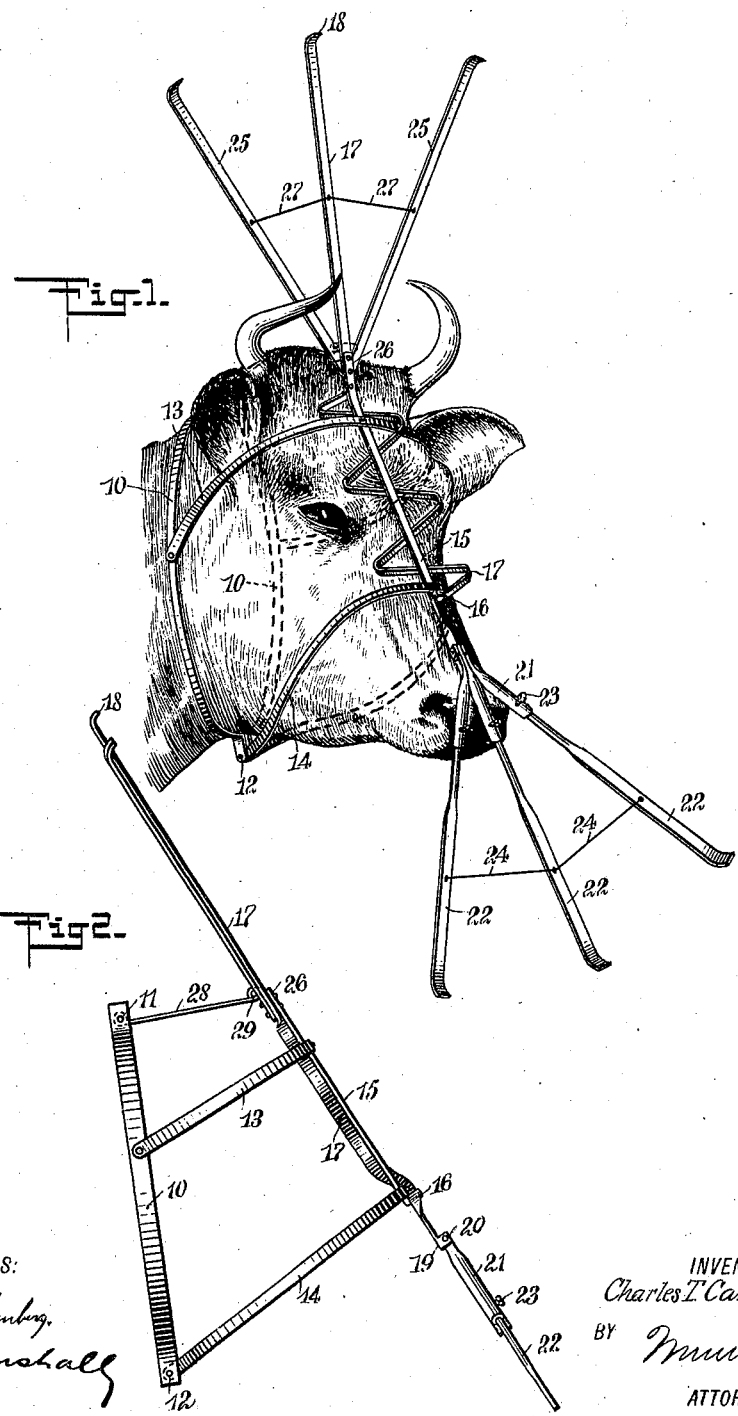
WITNESSES:
INVENTOR
Charles T. Carleton
BY
ATTORNEYS

UNITED STATES PATENT OFFICE.

CHARLES T. CARLETON, OF PORTALES, TERRITORY OF NEW MEXICO.

YOKE FOR CATTLE.

977,928.  Specification of Letters Patent.  Patented Dec. 6, 1910.

Application filed April 16, 1910. Serial No. 555,944.

*To all whom it may concern:*

Be it known that I, CHARLES T. CARLETON, a citizen of the United States, and a resident of Portales, in the county of Roosevelt and Territory of New Mexico, have invented a new and Improved Yoke for Cattle, of which the following is a full, clear, and exact description.

My invention relates to yokes for cattle, and it has for its object to provide one which may be constructed at little expense, and which is strong and durable, the yoke being adjustable and the whole arrangement being such that the yoke is certain in its action.

Another object of the invention is to provide a yoke which will prevent cattle from getting under, over or through fences. The yoke is especially devised for use on cows, horses and mules.

Another object of the invention is to provide a yoke which will prevent cattle from slackening fence wires and from otherwise damaging fences of all kinds.

Another object of the invention is to provide a yoke which will prevent cattle from feeding under, over or through fences, and also to prevent horses and mules from biting each other.

A further object of the invention is to provide a yoke which will prevent cattle from eating stacked feed, and the invention is also useful in the weaning of cattle.

Further objects of the invention will appear in the following complete description.

In this specification I will describe the preferred form of my invention, it being understood that the scope of the invention is defined in the appended claims.

Reference is to be had to the accompanying drawings forming a part of this specification, in which similar characters of reference indicate corresponding parts in both figures; and in which—

Figure 1 is a perspective view, showing the head of an animal with my device thereon; and Fig. 2 is a side elevation of the yoke.

By referring to the drawings it will be seen that two collar members 10 are provided, which are bolted together at their upper and lower terminals 11 and 12, respectively. These collars are adapted to be disposed around the head of an animal, there being two loops 13 and 14 pivoted to the collar members 10, the loop 13 being adapted to be disposed across the head of the animal below the ears and above the eyes and the loop 14 being adapted to be disposed across the face of the animal below the eyes. The loop 13 is pivoted to the collar members 10 at a distance below their upper terminals, the loop 14 being pivoted to the collar members 10 at their lower terminals. A rod 15 is secured to the loops 13 and 14, the rod 15 extending some distance above the loop 13 and having an extending eye 16 disposed just below the loop 14. A long metal bar 17 is provided, which extends some distance above the loop 13, and has its upper terminal 18 fashioned in the shape of a prong, the bar 17 being bent to the right and to the left below a point where it is secured to the rod 15, the bar 17 also being disposed through the eye 16 and being then bent downwardly and having its terminal 19 provided with a bearing 20. Three prong members 21 are pivotally connected with this bearing 20 by means of a bolt, the two outer prong members of the three said prong members 21 diverging downwardly. These prong members 21 are tubular in form at their lower terminals, prong members 22 being disposed in these tubular portions respectively and being held in place relatively to the prong members 21 by means of thumb screws 23 which mesh in threaded orifices in the prong members 21 and which engage the prong members 22, holding them in place. The lower terminals of the prong members 22 are bent outwardly. The prong members 22 are connected together by wire 24. Two prong members 25 are provided, one disposed at each side of the bar 17, the prong members 25 converging to a point 26 where they are secured by means of bolts to the bar 17 and the rod 15. The prong members 25 and the bar 17 are connected together by a wire 27. The prong members 25 have their upper terminals bent forwardly. A link 28 is pivoted to the collar members 10 at 11, the said link being pivoted to the bar 17 at 29.

It will be understood that instead of bolting the members of the yoke, they may be secured together by means of pins having slots in which are disposed keys, to prevent the pins from slipping out of position.

In using the yoke, the collar members 10 are disconnected one from the other, and the bar 17 and the rod 15 are disposed against the face of the animal, and the loops 13 and 14 are disposed one at each side of the head, of the animal. The collar members 10 then fall in place around the neck of the animal and are secured together at 11 and 12, and the link 28 and the loop 14 secured thereto in the manner described.

Having thus described my invention, I claim as new and desire to secure by Letters Patent:

1. In a yoke for cattle, a collar, a member, means by which the member is supported by the collar, a series of prong members pivoted to the said member, the prong members having tubular portions, a second series of prong members having terminals disposed in the tubular portions of the first-mentioned prong members respectively, means for holding the prong members in the second series relatively to the prong members in the first series respectively, and members connecting the second-mentioned prong members.

2. In a yoke for cattle, a collar, a loop secured to the collar and adapted to be disposed across the face of an animal, a member bent back and forth and secured relatively to the loop, the member being extended upwardly a distance above the loop and having its upper terminal fashioned into a prong, a series of prong members pivoted to the bent member at its lower end, the prong members having tubular portions, and a second series of prong members having terminals disposed in the tubular portions of the first-mentioned prong members respectively, means for holding the prong members in the second series relatively to the prong members in the first series respectively, and members connecting the second-mentioned prong members.

3. In a yoke for cattle, two collar members having upper and lower terminals respectively, a loop having two terminals, a bolt connecting the lower terminals of the collar members, the bolt being disposed through orifices in the terminals of the loop, a bolt connecting the upper terminals of the collar members, a link pivoted to the second bolt, a bent member, means pivotally connecting the bent member to the link, and means for holding the bent member relatively to the loop.

In testimony whereof I have signed my name to this specification in the presence of two subscribing witnesses.

CHARLES T. CARLETON.

Witnesses:
   T. J. MOLINARI,
   W. C. LIGHTFOOT.